United States Patent
Rinehart et al.

(10) Patent No.: US 11,775,592 B2
(45) Date of Patent: Oct. 3, 2023

(54) SYSTEM AND METHOD FOR ASSOCIATION OF DATA ELEMENTS WITHIN A DOCUMENT

(71) Applicant: SECURITI, Inc., Coyote, CA (US)

(72) Inventors: Michael Rinehart, Pleasanton, CA (US); Humza Iqbal, Mill Valley, CA (US)

(73) Assignee: SECURITI, Inc., Coyote (CA)

( * ) Notice: Subject to any disclaimer, the term of this patent is extended or adjusted under 35 U.S.C. 154(b) by 97 days.

(21) Appl. No.: 17/089,762

(22) Filed: Nov. 5, 2020

(65) Prior Publication Data

US 2022/0043858 A1 Feb. 10, 2022

Related U.S. Application Data

(60) Provisional application No. 63/062,783, filed on Aug. 7, 2020.

(51) Int. Cl.
*G06F 16/908* (2019.01)
*G06F 16/9035* (2019.01)
*G06V 30/413* (2022.01)
*G06V 30/416* (2022.01)

(52) U.S. Cl.
CPC ........ *G06F 16/908* (2019.01); *G06F 16/9035* (2019.01); *G06V 30/413* (2022.01); *G06V 30/416* (2022.01)

(58) Field of Classification Search
CPC . G06F 16/908; G06F 16/9035; G06V 30/413; G06V 30/416
See application file for complete search history.

(56) References Cited

U.S. PATENT DOCUMENTS

| | | | | |
|---|---|---|---|---|
| 8,449,355 | B2* | 5/2013 | Moon | B24B 13/015 451/388 |
| 8,499,355 | B1* | 7/2013 | Goncharov | H04L 63/1441 726/25 |
| 10,523,170 | B1* | 12/2019 | Brailovskiy | H04R 1/406 |
| 10,635,506 | B1* | 4/2020 | Dintenfass | G06F 16/9537 |
| 2003/0004960 | A1* | 1/2003 | Pressmar | G06F 16/282 |

(Continued)

FOREIGN PATENT DOCUMENTS

KR 10-2020-0084436 7/2020

*Primary Examiner* — Mariela Reyes
*Assistant Examiner* — Fernando M Mari Valcarcel
(74) *Attorney, Agent, or Firm* — Jason C. Cameron

(57) ABSTRACT

A system for association of data elements within a document is disclosed. An input data receiving subsystem receives an input data source of the document. A feature generation subsystem obtains one or more lists of personal data, generates one or more personal data features representing a relationship between one or more personal data elements. An affinity computation subsystem assesses each of the one or more personal data features, computes affinity score between the one or more personal data elements, generates one or more affinities. A personal data relationship identification subsystem assigns the one or more personal data elements to corresponding one or more identification stages, derives a set of identities corresponding to the one or more personal data elements. An identity filtration subsystem receives the one or more affinities and the set of identities, determines a validation of the set of identities, filters out the set of identities.

16 Claims, 5 Drawing Sheets

(56) References Cited

U.S. PATENT DOCUMENTS

| | | | |
|---|---|---|---|
| 2010/0114911 A1* | 5/2010 | Al-Kofahi | G06F 18/254 |
| | | | 707/E17.046 |
| 2013/0031032 A1* | 1/2013 | Mehta | G06F 16/80 |
| | | | 707/723 |
| 2015/0254462 A1* | 9/2015 | Takahashi | G06F 21/6254 |
| | | | 726/26 |
| 2016/0378727 A1 | 12/2016 | Rubinov et al. | |
| 2018/0308128 A1* | 10/2018 | Deluca | H04W 4/23 |
| 2019/0384971 A1* | 12/2019 | Borodin | G06V 30/414 |
| 2020/0174966 A1* | 6/2020 | Szczepanik | G06F 16/13 |
| 2020/0184210 A1* | 6/2020 | Malabarba | G06V 10/426 |

\* cited by examiner

SYSTEM AND METHOD FOR ASSOCIATION OF DATA ELEMENTS WITHIN A DOCUMENT

EARLIEST PRIORITY DATE

This application claims priority from a Provisional patent application filed in the United States of America having Patent Application No. 63/062,783, filed on Aug. 7, 2020, and titled "ASSOCIATING DATA ELEMENTS TO AN INDIVIDUAL WITHIN A DOCUMENT".

BACKGROUND

Embodiments of the present disclosure relate to a document processing and understanding system and more particularly to a system and a method for association of data elements within a document.

With emerging rise of artificial intelligence technology such as natural language processing (NLP), enterprises are getting benefitted in processing of large corpuses of enterprise documents easily. The artificial intelligence technology utilized by the document understanding systems helps in automatically extracting, categorizing, and providing a deep understanding of the enterprise documents, thus helps in providing businesses better context and insights to improve operations and decision making. Generally, the deep understanding of the enterprise documents helps in automatic discovery of personal data from the enterprise documents such as a legal document, a financial document, policies, a contract and the like. The discovery of the personal data from the enterprise documents are essential for identification of an association of the personal data with an individual. Various systems are available which processes the documents and determines a possible owner associated with the personal data extracted from the document.

Conventionally, processing the enterprise documents and discovering the personal data is accomplished by utilization of data loss prevention systems. However, such conventional data loss prevention systems result in extraction of noisy personal data resulting in higher false-positive or false-negative rate and affects accuracy in extraction of the personal data. Also, such a conventional system is unable to relate the personal data in the document for constituting personal identity of the owner. Moreover, such a conventional system is unable to return relevant personal data belonging to the owner. Furthermore, such a conventional system is capable of processing the enterprise documents in small scale and scalability issue is not addressed properly while processing the enterprise documents in a scale far beyond the limits. In addition, such a conventional system creates difficulty in extraction of personal data from an image format of the enterprise documents as features in images are relatively simple and do not have analogs in text data. Also, such a conventional system is unable to understand and find all expressions related to a same entity in a text by ignoring consideration of a named entity recognition document understanding technique, thus creates difficulty in determining accurate personal data related to the entity.

Hence, there is a need for an improved system and a method for association of data elements within a document in order to address the aforementioned issues.

BRIEF DESCRIPTION

In accordance with an embodiment of the present disclosure, a system for association of data elements within a document is disclosed. The system includes an input data receiving subsystem configured to receive an input data source of the document in one or more formats. The system also includes a feature generation subsystem operatively coupled to the input data receiving subsystem. The feature generation subsystem is configured to obtain one or more lists of personal data extracted from the input data source upon scanning the input data source of the document using a data source scanning technique. The feature generation subsystem is also configured to generate one or more personal data features representing a relationship between one or more personal data elements obtained from the one or more lists of the personal data. The system also includes an affinity computation subsystem operatively coupled to the feature generation subsystem. The affinity computation subsystem is configured to assess each of the one or more personal data features generated from the one or more personal data elements at a predetermined time interval based on consideration of one or more levels of affinity. The affinity computation subsystem is also configured to compute an affinity score between the one or more personal data elements using at least one type of affinity function upon assessment of each of the one or more personal data features. The affinity computation subsystem is also configured to generate one or more affinities for quantification of the relationship between the one or more personal data elements based on the affinity score computed. The system also includes a personal data relationship identification subsystem operatively coupled to the affinity computation subsystem. The personal data relationship identification subsystem is configured to assign the one or more personal data elements to corresponding one or more identification stages based on the one or more affinities generated. The personal data relationship identification subsystem is also configured to derive a set of identities corresponding to the one or more personal data elements of an individual assigned on the one or more identification stages using an identity creation technique. The system also includes an identity filtration subsystem operatively coupled to the personal data relationship identification subsystem. The identity filtration subsystem is configured to receive the one or more affinities and the set of identities corresponding to the one or more personal data elements of the individual. The identity filtration subsystem is also configured to determine a validation of the set of identities corresponding to the one or more data elements of the individual based on a utilisation of an identity filtration technique. The identity filtration subsystem is also configured to filter out the set of identities by eliminating one or more false positive identities based on the validation of the set of identities corresponding to the one or more data elements of the individual determined.

In accordance with another embodiment of the present disclosure, a method for association of data elements within a document is disclosed. The method includes receiving, by an input data receiving subsystem, an input data source of the document in one or more formats. The method also includes obtaining, by a feature generation subsystem, one or more lists of personal data extracted from the input data source upon scanning the input data source of the document using a data source scanning technique. The method also includes generating, by the feature generation subsystem, one or more personal data features representing a relationship between one or more personal data elements obtained from the one or more lists of the personal data. The method also includes assessing, by an affinity computation subsystem, each of the one or more personal data features generated from the one or more personal data elements at a predetermined time interval based on consideration of one or more levels of affinity. The method also includes computing, by the affinity computation subsystem, an affinity score between the one or more personal data elements using at least one type of affinity function upon assessment of each of the one or more personal data features. The method also includes generating, by the affinity computation subsystem, one or more affinities for quantification of the relationship between the one or more personal data elements based on the affinity score computed. The method also includes assigning, by a personal data relationship identification subsystem, the one or more personal data elements to corresponding one or more identification stages based on the one or more affinities generated. The method also includes deriving, by the personal data relationship identification subsystem, a set of identities corresponding to the one or more personal data elements of an individual assigned on the one or more identification stages using an identity creation technique. The method also includes receiving, by an identity filtration subsystem, the one or more affinities and the set of identities corresponding to the one or more personal data elements of the individual. The method also includes determining, by the identity filtration subsystem, a validation of the set of identities corresponding to the one or more data elements of the individual based on a utilisation of an identity filtration technique. The method also includes filtering out, by the identity filtration subsystem, the set of identities by eliminating one or more false positive identities based on the validation of the set of identities corresponding to the one or more data elements of the individual determined.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
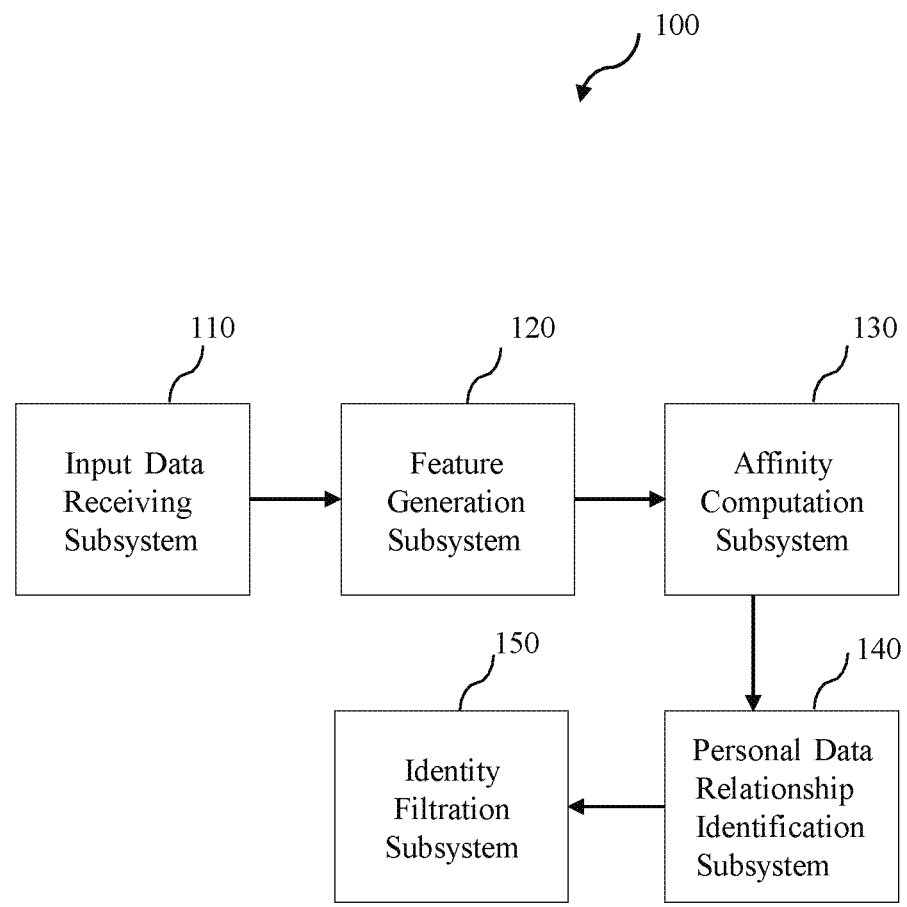
FIG. 1 is a block diagram of a system for association of data elements within a document in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for association of data elements within a document. The system includes an input data receiving subsystem configured to receive an input data source of the document in one or more formats. The system also includes a feature generation subsystem operatively coupled to the input data receiving subsystem. The feature generation subsystem is configured to obtain one or more lists of personal data extracted from the input data source upon scanning the input data source of the document using a data source scanning technique. The feature generation subsystem is also configured to generate one or more personal data features representing a relationship between one or more personal data elements obtained from the one or more lists of the personal data. The system also includes an affinity computation subsystem operatively coupled to the feature generation subsystem. The affinity computation subsystem is configured to assess each of the one or more personal data features generated from the one or more personal data elements at a predetermined time interval based on consideration of one or more levels of affinity. The affinity computation subsystem is also configured to compute an affinity score between the one or more personal data elements using at least one type of affinity function upon assessment of each of the one or more personal data features. The affinity computation subsystem is also configured to generate one or more affinities for quantification of the relationship between the one or more personal data elements based on the affinity score computed. The system also includes a personal data relationship identification subsystem operatively coupled to the affinity computation subsystem. The personal data relationship identification subsystem is configured to assign the one or more personal data elements to corresponding one or more identification stages based on the one or more affinities generated. The personal data relationship identification subsystem is also configured to derive a set of identities corresponding to the one or more personal data elements of an individual assigned on the one or more identification stages using an identity creation technique. The system also includes an identity filtration subsystem operatively coupled to the personal data relationship identification subsystem. The identity filtration subsystem is configured to receive the one or more affinities and the set of identities corresponding to the one or more personal data elements of the individual. The identity filtration subsystem is also configured to determine a validation of the set of identities corresponding to the one or more data elements of the individual based on a utilisation of an identity filtration technique. The identity filtration subsystem is also configured to filter out the set of identities by eliminating one or more false positive identities based on the validation of the set of identities corresponding to the one or more data elements of the individual determined.

FIG. 1 is a block diagram of a system 100 for association of data elements within a document in accordance with an embodiment of the present disclosure. The system 100 includes an input data receiving subsystem 110 configured to receive an input data source of the document in one or more formats. As used herein, the term 'document' is defined as an enterprise document such as a legal agreement, financial report, a contract or a policy from which personal data of an individual is obtained. In one embodiment, the input data source of the document may include at least one of a structured data source, a semi-structured data source, an unstructured data source or a combination thereof. As used herein, the term 'structured data source' is defined as any data source with a consistent structure and format of organization. Similarly, the term 'semi structured data source' is defined as any data source with somewhat consistent structure. Again, the term 'unstructured data source' is defined as any data source which data is organized haphazardly without following a specific format or a rule for organization. In one embodiment, the structured data source may include, but not limited to, a database, a comma separated value (CSV) data, a tabular based data organization, a JavaScript object notation (JSON) format data, an extensible mark-up language (XML) format data and the like. In another embodiment, the semi-structured format data source may include, but not limited to, an application form data, a loan form data, a survey form data, a complain form data, a feedback form data and the like. In yet another embodiment, the unstructured data source may include, but not limited to, a letter, a message, an email, a notice and the like. In one embodiment, the one or more formats may include at least one of a text format, an image format or a combination thereof.

The system 100 also includes a feature generation subsystem 120 operatively coupled to the input data receiving subsystem 110. The feature generation subsystem 120 is configured to obtain one or more lists of personal data extracted from the input data source upon scanning the input data source of the document using a data source scanning technique. In one embodiment, the one or more lists of the personal data may include at least one of a static list of one or more personal data elements, a dynamic stream of one or more personal data elements or a combination thereof. In such embodiment, the static list of one or more personal data elements are obtained by scanning the input data source of the document in advance. In another embodiment, the dynamic stream of one or more personal data elements are generated dynamically during scanning of the input data source. In such embodiment, the data scanning technique may include an optical character recognition (OCR) technique for scanning the input data source statically or dynamically.

The feature generation subsystem 120 is also configured to generate one or more personal data features representing a relationship between one or more personal data (PD) elements obtained from the one or more lists of the personal data. The feature generation subsystem 120 takes the one or more personal data elements extracted along with information about the input data source such as text or image format of the data source and uses it to convert the PD into a machine learnable representation. In one embodiment, the one or more personal data features may include at least one of a node feature, an edge feature, a chord feature, a metadata feature, a personal data content-based feature or a combination thereof. As used herein, the term 'node feature' is defined as a feature which represent an attribute regarding one personal data element. Similarly, the term 'edge feature' is defined as a feature which represent an attribute regarding two personal data elements. Again, the term 'chord feature' is defined as a feature which represent an attribute regarding three or more personal data elements. In some embodiment, the node feature may include, but not limited to, a length of a PD element, a language of a PD element, a type of the PD element, a category of the PD element, a location of the PD in the input data source, a number of similar PDs in terms of type or text, closeness value of a PD with a related PD, related text or a related anchor, a confidence value of false positive PD and the like. In another embodiment, the edge feature may include, but not limited to, a similar type verification of two PDs, a same category verification of two PDs, an average distance of PD covered by the edge, a text similarity between two PDs, number of PDs closer with the two PDs covered by the edge and the like. In yet another embodiment, the chord feature may include, but not limited to, number of PDs having same type, number of PD s having same category, average distance between PDs covered by the chord or n-ary set, average text similarity between the PDs covered by the chord, number of PDs close to the set of the PD covered by the chord and the like.

In one embodiment, the metadata feature may include at least one of features associated with a type of input data source, features associated with a size of input data source or a combination thereof. In such embodiment, the features associated with the type of the data source may include, but not limited to, a file type, an input data source size, a topic of the document, a document summary and the like. The one or more personal data features are further split and considered based on the specific type of the data source. For a tree-based structured data source, the node feature may include determination of uniqueness of the PD. Again, for the tree-based structured data source, edge feature may include identification of an occurrence of the two PDs in a same row of a table. Further, the chord feature for the table-based structured data source may include determination of occurrence of the set of PDs in the same row of a table or determination of mean or median for the number of PDs that occur in the same row and the like.

For tree-based structured data source, the node feature may include determination of farness of the PD from a root of the tree. Similarly, the edge feature for the tree-based structured data source may include determination of a header or a key string similarity for a PD value, distance in the tree, string similarity of the values depending on the type and the like. Again, the chord feature for the tree-based structured data source may include determination of average header or key string similarity of the PDs, determination of average distance between the PDs, average string similarity of values of the PDs and the like.

In case of the semi-structure data source, the node feature may include at least one of checking PD as a part of a data field, anchor field or a background text area, position or distribution of the PD or a combination thereof. Also, the edge feature for the semi-structured data source may include checking of a group of PDs as part of a same field, determination of distances and positions of the PDs in the document or a combination thereof. Further, the chord feature for the semi-structured data source may include determination of the group of the PDs as part of the same field, determination of average or median number of the PDs as part of the same field, average or median distances and positions of the PDs in the document or a combination thereof.

Again, for the unstructured data source, the node feature may include a field type in the document, a line number position or a character position in the line, parts of speech in the text or a combination thereof. Similarly, the edge feature for the unstructured data source may include determination of the two PDs as part of same section, paragraph, sentence, or a part of a sentence, parse tree relationship between the two PDs or a combination thereof. Again, the chord feature for the unstructured data source may include determination of the PDs as part of the same section, paragraph, sentence or part of the sentence, average or median PDs part of the same section, parse tree relationships of the PDs, distribution of the parse tree relationships among the PDs or a combination thereof.

In a specific embodiment, the personal data content-based feature corresponding to structured input data source is analysed by utilising a plurality of structured data source specific parameters including at least one of number of rows in a table, similarity relationship between a table name and a column name, identification of a repetitive personal data in a column, a confidence value of a column comprising a specific personal data, number of levels in a tree, similarity of keys, continuous representation of personal data in a tree format or a combination thereof. In another embodiment, the personal data content-based feature corresponding to the semi-structured input data source is analysed by utilising a plurality of semi-structured data source specific parameters comprising at least one of one or more visuals analysis of the personal data for a chunk, a page and a document, text analysis of the personal data for a chunk, a page and a document or a combination thereof. In such embodiment, the one or more visuals may include, but not limited to, whitespaces, symbols, characters and the like. In some embodiment, the text analysis of the PD may include at least one of an analysis of meaning of the PD content, a continuous representation analysis for capturing a summary of the PD content, word vector analysis, language modelling, analysis of per token or sentence continuous representations, outputs of different layers of a language model or a combination thereof. In yet another embodiment, the personal data content-based feature corresponding to the un-structured input data source is analysed by utilising a plurality of unstructured data source specific parameters comprising at least one of a continuous representation of personal data analysis for capturing a summary of a personal data content, a per token or a continuous sentence representation analysis of the personal data or a combination thereof.

The system 100 also includes an affinity computation subsystem 130 operatively coupled to the feature generation subsystem 120. The affinity computation subsystem 130 is configured to assess each of the one or more personal data features generated from the one or more personal data elements at a predetermined time interval based on consideration of one or more levels of affinity. In one embodiment, the one or more levels of the affinity may include at least one of node-level affinity, an edge level affinity, a chord level affinity or a combination thereof. As used herein, the term 'node level affinity' is defined as assessment of the PD being real or a false positive (FP) PD upon comparison with other PDs. Similarly, the term 'edge level affinity' is defined as assessment of the two PDs belonging to a same identity. Again, the term 'chord level affinity' is defined as an assessment that three or more PDs belong to the same identity. The affinity computation subsystem 130 is also configured to compute an affinity score between the one or more personal data elements using at least one type of affinity function upon assessment of each of the one or more personal data features. In one embodiment, the affinity score may include, but not limited to, a probability, a logit, an unbounded score, a binary value, an energy value, a correlation value or a combination thereof. The at least one type of affinity function takes multiple forms for computation of the affinity score. The at least one affinity function is either hardcoded using a set of affinity rules or equations derived from the one or more PD features extracted. The at least one affinity function may also include a parametrized equation in which multiple parameters derived from the one or more PD features. Also, the at least one affinity function may include a machine learning model where the parameters are learned using labelled data. In one embodiment, the machine learning model for the at least one affinity function may include, but not limited to, a supervised learning model, an unsupervised learning model, a reinforcement learning model and the like. In such embodiment, the supervised learning model may include, but not limited to, a logistic regression model, a decision tree model, a gradient boosting model, a bagging on a classifier, an ensemble model, a conditional random field model, a Markov random field model, a graphical model, a hierarchical Bayesian model, a neural network (NN) model such as feed forward neural network, a recurrent neural network (RNN), a convolutional neural network (CNN), a graph neural network, a transformer, an autoencoder, a mixture model and the like.

In another embodiment, the unsupervised learning model may include implementation of clustering technique, wherein the clustering technique may include, but not limited to, a spectral clustering technique, an agglomerative clustering technique, an embedding and clustering combination technique, a ratio-cut clustering technique, a Ncut clustering technique and the like. In yet another embodiment, the reinforcement learning model may implement reinforcement learning (RL) based technique. The reinforcement learning based technique updates assignment of the PD to the one or more levels of the affinity. For the RL formulation state space is the possible assignments of the PD to identities. The action space is the set of changes to the assignments of PD. A reward function is calculation of how much update to assignments brings an overall configuration closer to the truth. The reinforcement learning technique or a sequential decision-based technique picks a next step based on a previous output. In one embodiment, the reinforcement learning technique may include, but not limited to, a Q-learning technique, a temporal difference method, a Monte Carlo method, a value iteration technique, a policy iteration technique, a brute force technique, a direct policy search technique, a state action reward state action (SARSA) technique, a deep Q-networks (DQN), a deep deterministic policy gradient technique (DDPG), a trust region policy optimization (TRPO) technique and the like.

In a particular embodiment, the at least one type of the affinity function for the structured input data source may include at least one of a rule-based scheme for computation of affinity score, a feature based scheme for computation of affinity score, or a combination thereof. The rule-based scheme converts the input data source into a flat table for computation of the affinity score. The rule-based scheme utilizes predefined set of affinity rules for computation of the affinity score. The feature-based scheme utilizes the one or more levels of the affinity and the machine learning model to compute the at least one type of the affinity function. In another embodiment, the at least one type of the affinity function for the semi-structured data source may include at least one of a feature-based scheme for computation of affinity score, a distance based scheme for computation of affinity score or a combination thereof. In yet another embodiment, the at least one type of the affinity function for the un-structured data source comprises at least one of a feature-based scheme for computation of affinity score, a language-based scheme for computation of affinity score or a combination thereof. The affinity computation subsystem 130 is also configured to generate one or more affinities for quantification of the relationship between the one or more personal data elements based on the affinity score computed. The one or more affinities are high when the affinity score is high. Similarly, the one or more affinities between the PD elements are low when the affinity score is low. For example, the one or more affinities are high within rows of the table and low across the rows of the table with the exception that columns with highly unique PD that are repeated get low affinities since unlikely to belong to the primary identity of the row.

The system 100 also includes a personal data relationship identification subsystem 140 operatively coupled to the affinity computation subsystem 130. The personal data relationship identification subsystem 140 is configured to assign the one or more personal data elements to corresponding one or more identification stages based on the one or more affinities generated. The personal data relationship identification subsystem 140 is also configured to derive a set of identities corresponding to the one or more personal data elements of an individual assigned on the one or more identification stages using an identity creation technique. In one embodiment, the identity creation technique corresponding to the input data source may include at least one of a rule-based identity creation technique, a model-based identity creation technique or a combination thereof. In such embodiment, the identity creation technique corresponding to the structured input data source may include at least one of the rule-based identity creation technique, the model-based identity creation technique or a combination thereof. In another embodiment, the identity creation technique corresponding to the semi-structured input data source may include the model-based identity creation technique. In yet another embodiment, the identity creation technique for the unstructured data source may include the model-based identity creation technique.

The system 100 also includes an identity filtration subsystem 150 operatively coupled to the personal data relationship identification subsystem 140. The identity filtration subsystem 150 is configured to receive the one or more affinities and the set of identities corresponding to the one or more personal data elements of the individual. The identity filtration subsystem 150 is also configured to determine a validation of the set of identities corresponding to the one or more data elements of the individual based on a utilisation of an identity filtration technique. In one embodiment, the identity filtration technique may include at least one of a rule-based identity and affinity filtration technique, a learning-based affinity and identity filtration technique or a combination thereof. In such embodiment, the rule-based identity and affinity filtration technique may include, but not limited to, a mean, a max, a min, a median and the like for formulation of a summary statistics of the one or more affinities in the set of identities. In one embodiment, the learning-based affinity and identity filtration technique may include a machine learning based technique. The identity filtration subsystem is also configured to filter out the set of identities by eliminating one or more false positive identities based on the validation of the set of identities corresponding to the one or more data elements of the individual determined.

Figure 2:
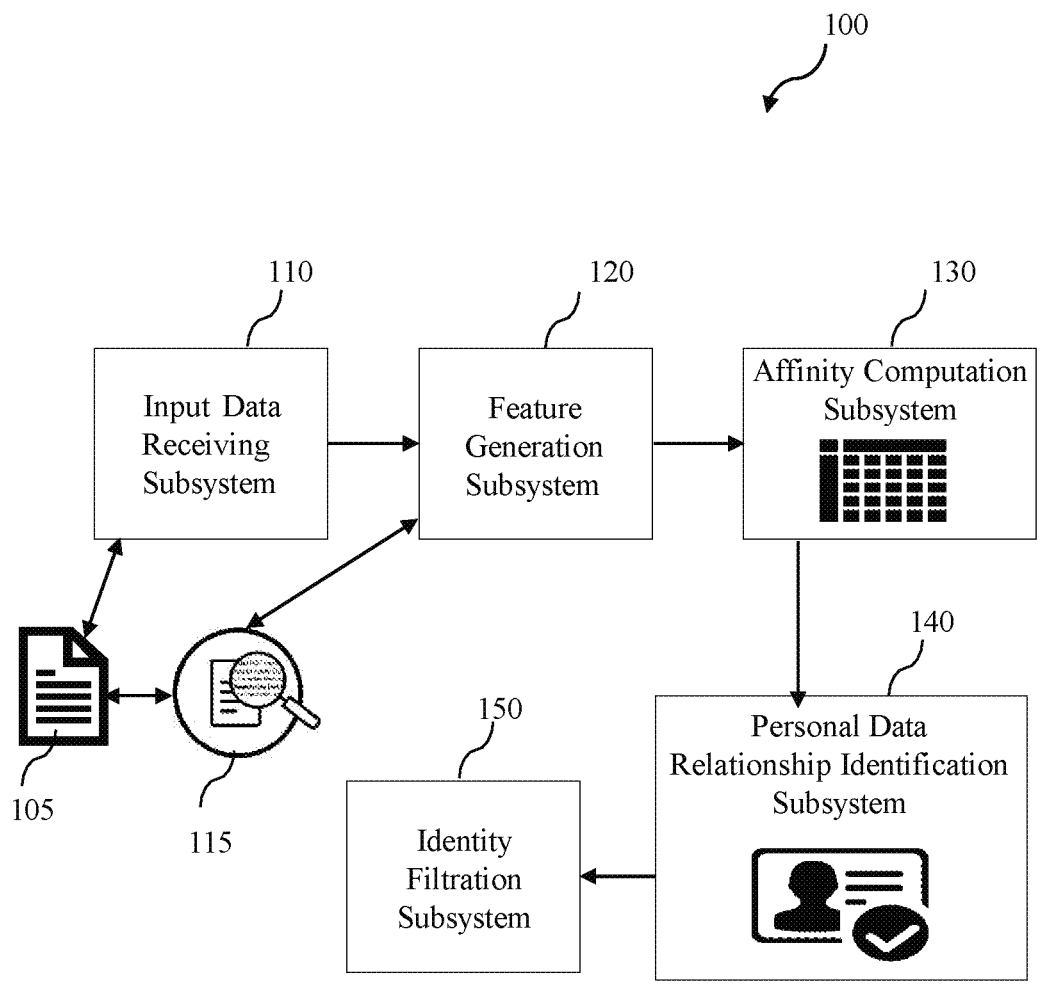
FIG. 2 illustrates a schematic representation of an exemplary embodiment of a system for association of data elements within a document of FIG. 1 in accordance with an embodiment of the present disclosure.

FIG. 2 illustrates a schematic representation of an exemplary embodiment of a system 100 for association of data elements within a document of FIG. 1 in accordance with an embodiment of the present disclosure. The system 100 is applicable in enterprises where the enterprises need to examine large corpuses of documents regularly and extract all personal data (PD) from the documents for association with relevant individuals. Once the documents containing information about a particular individual is found, the system extracts PD for the particular person from those documents in a machine-readable or a structured format and upon finding an identity relationship is provided to that particular individual. Considering an example, in which the document 105 of the individual is a legal document in text format. For initiating processing of such legal document of the individual, an input data receiving subsystem 110 receives input data source of the document. For example, the input data source of the legal document in this scenario is a structured data source, wherein the input data is organized in a form of tree-based representation. A feature generation subsystem 120 obtains a static list of personal data (PD) from the input data source upon scanning the document using an optical character recognition (OCR) scanner 115 in advance. From, the static list of the PD obtained, the feature generation subsystem 120 also generates one or more personal data (PD) features representing a relationship between one or more personal data (PD) elements. For example, the one or more PD features may include at least one of a node feature, an edge feature, a chord feature, a metadata feature, a personal data content-based feature or a combination thereof. Suppose in the example used herein, 'John Smith' and 'Jane Smith' with the type of each PD known by extracting from header of the tree-based representation. Again, for building a feature representation, the feature generation subsystem 120 considers the PD pairs to build a matrix. For example, the matrix formed between the PD pairs is represented as in matrix 1 as follows:

| Matrix 1 | | | | |
|---|---|---|---|---|
| | John | Smith | Jane | Smith |
| John | ✓ | X | X | X |
| Smith | X | ✓ | X | X |
| Jane | X | X | ✓ | X |
| Smith | X | X | X | ✓ |

In the above-mentioned matrix, boxes with '✓' represents the pairs between each PD and itself and has highest possible affinity. Again, the boxes with 'X' represents those pairs for which affinity score needs to be computed using at least one affinity function. Feature vectors for each of the pairs in the matrix are also computed.

Once, the feature vectors are computed, an affinity computation subsystem 130 assesses the one or more PD features at a predetermined time interval based on consideration of one or more levels of affinity. For example, the one or more levels of the affinity may include at least one of node-level affinity, an edge level affinity, a chord level affinity or a combination thereof. The affinity computation subsystem is also configured to compute the affinity score between the one or more personal data elements using the at least one type of affinity function. The affinity computation subsystem 130 computes the affinity score for every pair of detections. For the above-mentioned example, an output of the at least one affinity function is represented in a form a matrix 2 as follows:

| Matrix 2 | | | | |
|---|---|---|---|---|
| | John | Smith | Jane | Smith |
| John | A | C | A | b |
| Smith | B | D | c | d |
| Jane | a | B | A | C |
| Smith | c | D | B | D |

In Matrix 2, "A, B, C, D" represents the highest-possible affinity, and "a, b, c, d" represent the lowest possible affinity. Here, "A, B, C, D" for the PD pairs of PDs that the affinity function computed as belonging to the same individual such as 'John Smith', and "a, b, c, d" denote pairs of PDs that the affinity function computed as belonging to separate individuals such as 'Jane Smith'. The at least one affinity function for computation of the affinity score between each of the pairs includes a machine learning model where the parameters are learned using labelled data. For example, the machine learning model for the at least one affinity function may include, but not limited to, a supervised learning model, an unsupervised learning model, a reinforcement learning model and the like.

Once, the affinities for quantification of the relationship between the one or more personal data elements are generated, a personal data identification subsystem 140 assigns the one or more PD elements to corresponding one or more identification stages or levels. The personal data relationship identification subsystem is also configured to derive a set of identities corresponding to the one or more PD elements of an individual assigned on the one or more identification stages using an identity creation technique. For example, the identity creation technique may include at least one of a rule-based identity creation technique, a model-based identity creation technique or a combination thereof. Here, the model-based identity creation technique may include a machine learning model utilizing at least one of a clustering technique or a reinforcement learning technique to derive the set of identities. In the example used herein, "1, 2, 3, 4" refer to PD belonging to one individual such as 'John Smith' and "w, x, y, z" refers to PD belonging to another individual such as 'Jane Smith' as shown below in Matrix 3.

| Matrix 3 | | | | |
|---|---|---|---|---|
| | John | Smith | Jane | Smith |
| John | 1 | 2 | | |
| Smith | 3 | 4 | | |
| Jane | | | w | x |
| Smith | | | y | z |

Again, "blank boxes" in the matrix 3, indicates that corresponding PDs are not associated with same identity of an individual. Further, an identity filtration subsystem 150 receives the one or more affinities and the set of identities corresponding to the one or more personal data elements of the individual. The identity filtration subsystem 150 also determines a validation of the set of identities corresponding to the one or more data elements of the individual based on a utilisation of an identity filtration technique. Upon determination of the validation, the identity filtration subsystem also filters out the set of identities by eliminating one or more false positive identities based on the validation of the set of identities corresponding to the one or more data elements of the individual determined. For example, the identity filtration technique may include at least one of a rule-based identity and affinity filtration technique, a learning-based affinity and identity filtration technique or a combination thereof. Suppose in the example used herein, if only John Smith identity is determined as valid, then only filtered output as 'John Smith' is returned. Similarly, if Jane smith identity is determined as valid, then filtered output as 'Jane Smith' is returned by the identity filtration subsystem 150. Again, if neither of the identities of the PD are determined as valid, the in such a scenario nothing is returned as output. Thus, the system 100 helps in providing the set of identities such that all PD in an identity are associated with a single individual and each identity represents a unique individual by eliminating one or more false positives and filtering out noises for improving accuracy of association.

Figure 3:
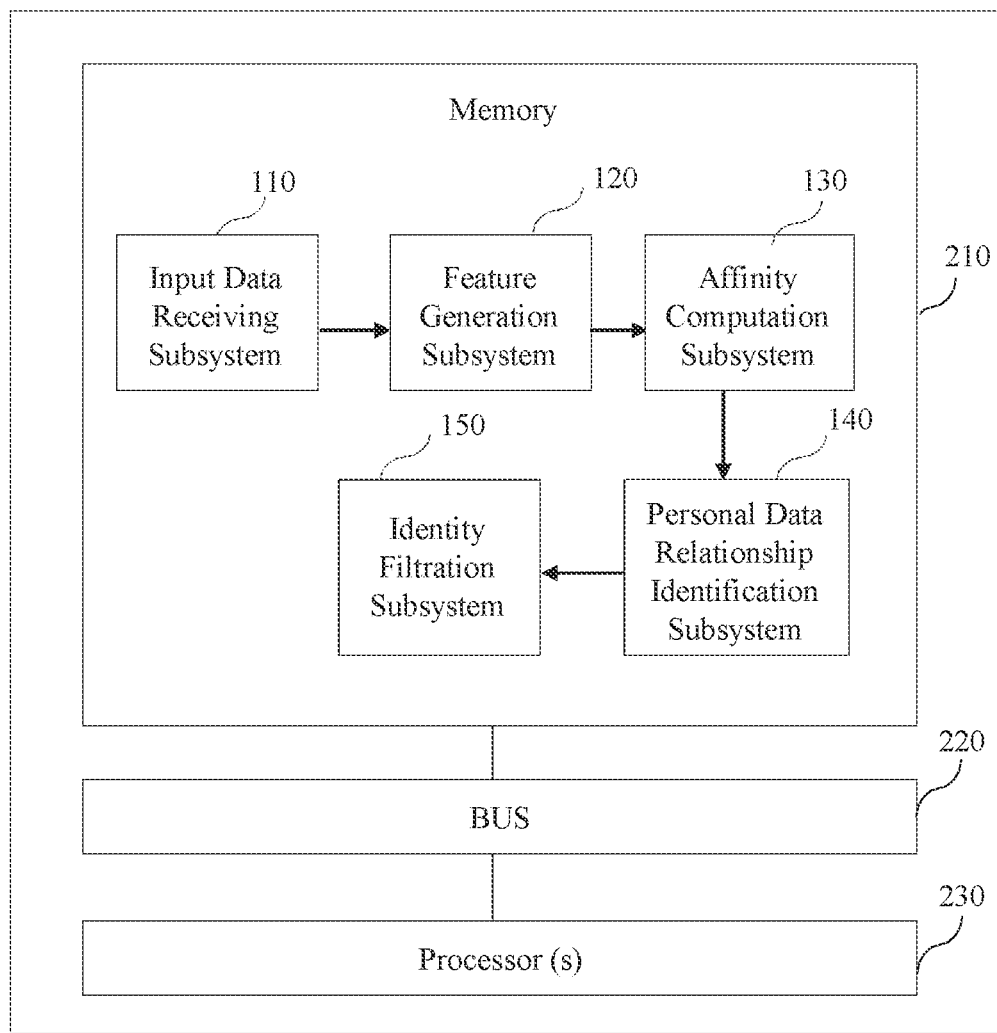
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 is substantially similar to a system 100 of FIG. 1. The memory 210 has following subsystem: an input data receiving subsystem 110, a feature generation subsystem 120, an affinity computation subsystem 130, a personal data relationship identification subsystem 140 and an identity filtration subsystem 150.

The input data receiving subsystem 110 is configured to receive an input data source of the document in one or more formats. The feature generation subsystem 120 is configured to obtain one or more lists of personal data extracted from the input data source upon scanning the input data source of the document using a data source scanning technique. The feature generation subsystem 120 is also configured to generate one or more personal data features representing a relationship between one or more personal data elements obtained from the one or more lists of the personal data. The affinity computation subsystem 130 is configured to assess each of the one or more personal data features generated from the one or more personal data elements at a predetermined time interval based on consideration of one or more levels of affinity. The affinity computation subsystem 130 is also configured to compute an affinity score between the one or more personal data elements using at least one type of affinity function upon assessment of each of the one or more personal data features. The affinity computation subsystem 130 is also configured to generate one or more affinities for quantification of the relationship between the one or more personal data elements based on the affinity score computed. The personal data relationship identification subsystem 140 is configured to assign the one or more personal data elements to corresponding one or more identification stages based on the one or more affinities generated. The personal data relationship identification subsystem 140 is also configured to derive a set of identities corresponding to the one or more personal data elements of an individual assigned on the one or more identification stages using an identity creation technique. The identity filtration subsystem 150 is configured to receive the one or more affinities and the set of identities corresponding to the one or more personal data elements of the individual. The identity filtration subsystem 150 is also configured to determine a validation of the set of identities corresponding to the one or more data elements of the individual based on a utilisation of an identity filtration technique. The identity filtration subsystem 150 is also configured to filter out the set of identities by eliminating one or more false positive identities based on the validation of the set of identities corresponding to the one or more data elements of the individual determined.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 4A:
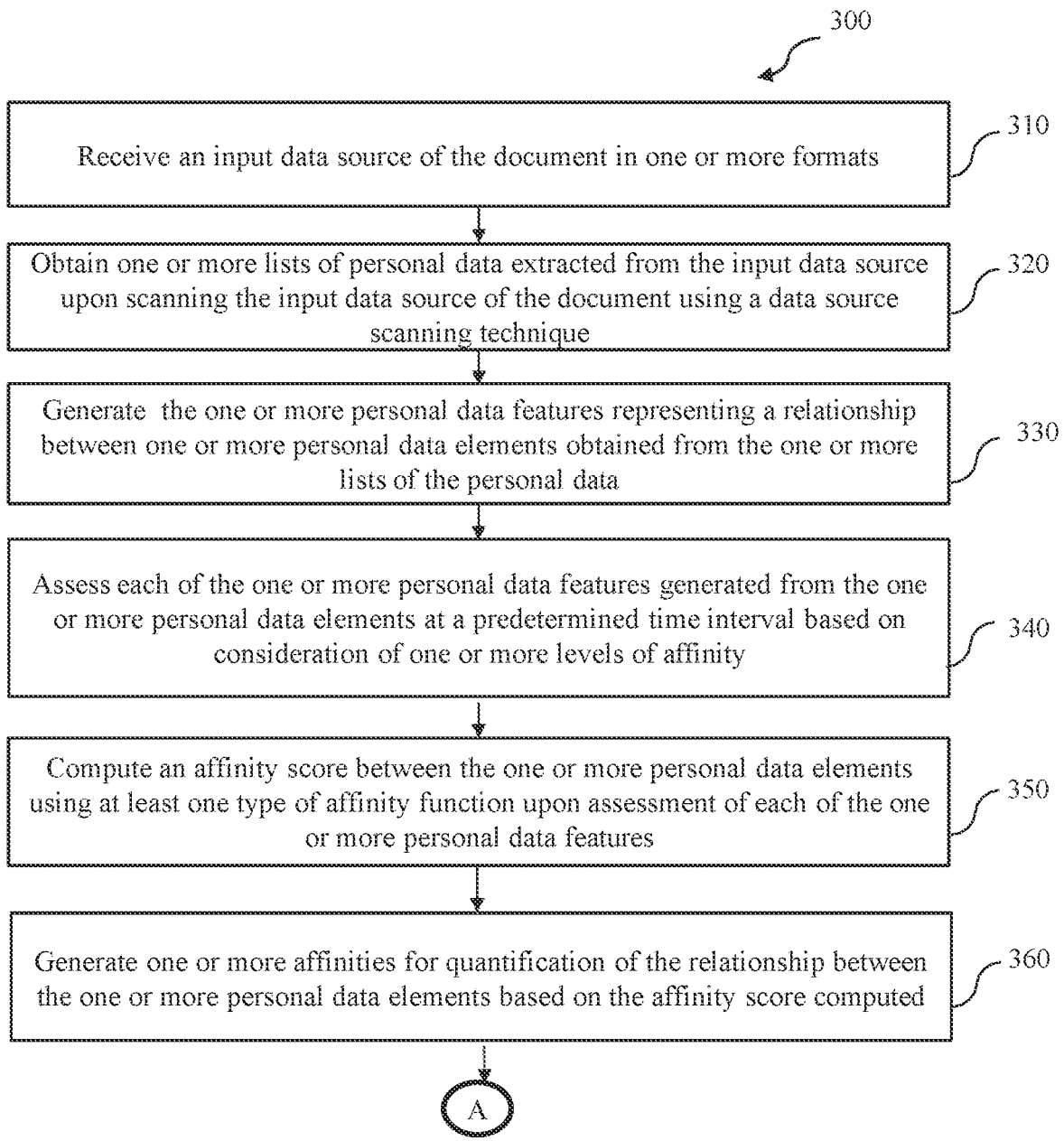
FIG. 4(a) is a flow chart representing the steps involved in a method for association of data elements within a document in accordance with the embodiment of the present disclosure.
Figure 4B:
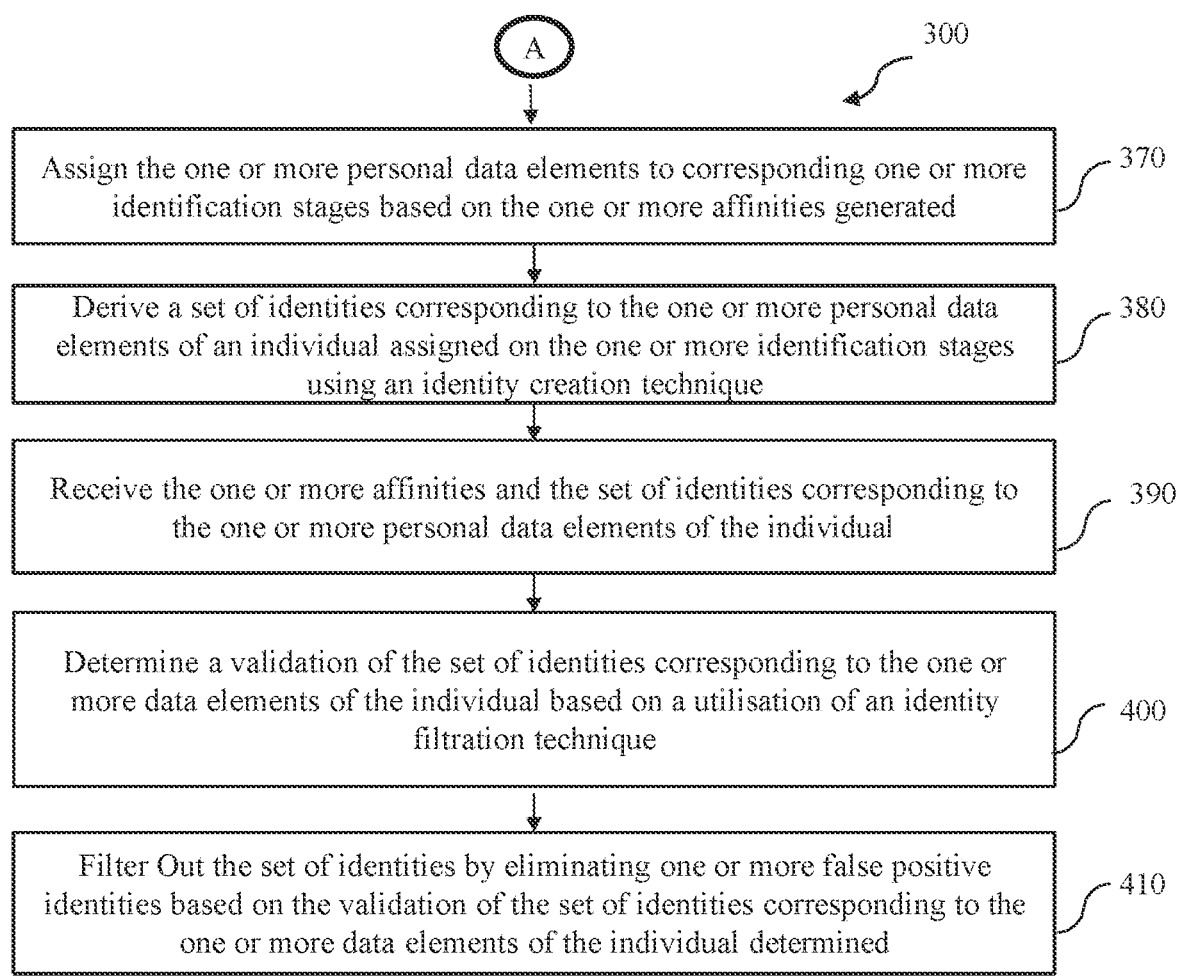
FIG. 4(b) depicts flow chart representing the continued steps of method of FIG. 4(b).

FIG. 4(*a*) is a flow chart representing the steps involved in a method 300 for association of data elements within a document in accordance with the embodiment of the present disclosure. FIG. 4(*b*) depicts flow chart representing the continued steps of method of FIG. 4(*b*). The method 300 includes receiving, by an input data receiving subsystem, an input data source of the document in one or more formats in step 310. In one embodiment, receiving the input data source of the document may include receiving at least one of a structured datasource, a semi-structured data source, an unstructured data source or a combination thereof. In such embodiment, the structured data source may include, but not limited to, a database, a comma separated value (CSV) data, a tabular based data organization, a JavaScript object notation (JSON) format data, an extensible mark-up language (XML) format data and the like. In another embodiment, the semi-structured format data source may include, but not limited to, an application form data, a loan form data, a survey form data, a complain form data, a feedback form data and the like. In yet another embodiment, the unstructured data source may include, but not limited to, a letter, a message, an email, a notice and the like. In one embodiment, receiving the input data source of the document in the one or more formats may include receiving the input data source in at least one of a text format, an image format or a combination thereof.

The method 300 also includes obtaining, by a feature generation subsystem, one or more lists of personal data extracted from the input data source upon scanning the input data source of the document using a data source scanning technique in step 320. In one embodiment, obtaining the one or more lists of the personal data extracted from the input data source may include obtaining at least one of a static list of one or more personal data elements, a dynamic stream of one or more personal data elements or a combination thereof. In such embodiment, the static list of one or more personal data elements are obtained by scanning the input data source of the document in advance. In another embodiment, the dynamic stream of one or more personal data elements are generated dynamically during scanning of the input data source.

The method 300 also includes generating, by the feature generation subsystem, one or more personal data features representing a relationship between one or more personal data elements obtained from the one or more lists of the personal data in step 330. In some embodiment, generating the one or more personal data (PD) features representing the relationship between the one or more PD elements may include generating the one or more PD features including at least one of a node feature, an edge feature, a chord feature, a metadata feature, a personal data content-based feature or a combination thereof. In such embodiment, generating the node feature may include generating features including but not limited to, a length of a PD element, a language of a PD element, a type of the PD element, a category of the PD element, a location of the PD in the input data source, a number of similar PDs in terms of type or text, closeness value of a PD with a related PD, related text or a related anchor, a confidence value of false positive PD and the like. In another embodiment, generating the edge feature may include generating a similar type verification of two PDs, a same category verification of two PDs, an average distance of PD covered by the edge, a text similarity between two PDs, number of PDs closer with the two PDs covered by the edge and the like. In yet another embodiment, generating the chord feature may include generating features including, but not limited to, number of PDs having same type, number of PD s having same category, average distance between PDs covered by the chord or n-ary set, average text similarity between the PDs covered by the chord, number of PDs close to the set of the PD covered by the chord and the like.

The method 300 also includes assessing, by an affinity computation subsystem, each of the one or more personal data features generated from the one or more personal data elements at a predetermined time interval based on consideration of one or more levels of affinity in step 340. In one embodiment, assessing each of the one or more PD features generated from the one or more PD elements may include assessing each of the one or more PD features based on consideration of at least one of node-level affinity, an edge level affinity, a chord level affinity or a combination thereof.

The method 300 also includes computing, by the affinity computation subsystem, an affinity score between the one or more personal data elements using at least one type of affinity function upon assessment of each of the one or more personal data features in step 350. In some embodiment, computing the affinity score between the one or more PD elements using the at least one type of the affinity function may include computing the affinity score which may include, but not limited to, a probability, a logit, an unbounded score, a binary value, an energy value, a correlation value or a combination thereof. In one embodiment, the at least one type of the affinity function for the structured input data source may include at least one of a rule-based scheme for computation of affinity score, a feature based scheme for computation of affinity score, or a combination thereof. In another embodiment, the at least one type of the affinity function for the semi-structured data source may include at least one of a feature-based scheme for computation of affinity score, a distance based scheme for computation of affinity score or a combination thereof. In yet another embodiment, the at least one type of the affinity function for the un-structured data source comprises at least one of a feature-based scheme for computation of affinity score, a language-based scheme for computation of affinity score or a combination thereof. The method 300 also includes generating, by the affinity computation subsystem, one or more affinities for quantification of the relationship between the one or more personal data elements based on the affinity score computed in step 360.

The method 300 also includes assigning, by a personal data relationship identification subsystem, the one or more personal data elements to corresponding one or more identification stages based on the one or more affinities generated in step 370. The method 300 also includes deriving, by the personal data relationship identification subsystem, a set of identities corresponding to the one or more personal data elements of an individual assigned on the one or more identification stages using an identity creation technique in step 380. In one embodiment, deriving the set of identities corresponding to the input data source may include at least one of a rule-based identity creation technique, a model-based identity creation technique or a combination thereof. In such embodiment, the identity creation technique corresponding to the structured input data source may include at least one of the rule-based identity creation technique, the model-based identity creation technique or a combination thereof. In another embodiment, the identity creation technique corresponding to the semi-structured input data source may include the model-based identity creation technique. In yet another embodiment, the identity creation technique for the unstructured data source may include the model-based identity creation technique.

The method 300 also includes receiving, by an identity filtration subsystem, the one or more affinities and the set of identities corresponding to the one or more personal data elements of the individual in step 390. The method 300 also includes determining, by the identity filtration subsystem, a validation of the set of identities corresponding to the one or more data elements of the individual based on a utilization of an identity filtration technique in step 400. In one embodiment, determining the validation of the set of the identities corresponding to the one or more data elements of the individual based on the utilization of the identity filtration technique may include determining the validation of the set of the identities based on the utilization of at least one of a rule-based identity and affinity filtration technique, a learning-based affinity and identity filtration technique or a combination thereof. In such embodiment, the rule-based identity and affinity filtration technique may include, but not limited to, a mean, a max, a min, a median and the like for formulation of a summary statistics of the one or more affinities in the set of identities. The method 300 also includes filtering out, by the identity filtration subsystem, the set of identities by eliminating one or more false positive identities based on the validation of the set of identities corresponding to the one or more data elements of the individual determined in step 410.

Various embodiments of the present disclosure provide an automated solution for addressing the association problem by taking as input personal data elements and returning the personal data elements relevant to an individual. The system also addresses the accuracy problem by filtering out noisy personal data elements that are fed to it and only returning the ones which belong to the individual.

Moreover, the present disclosed system also addresses scalability which does not rely on humans to read or scan the input data source from the document and enables handling of large corpuses of documents far beyond the limits in an efficient manner without involvement of manual intervention.

Furthermore, the present disclosed system utilizes a concept of coreference resolution which helps in understanding and finding all expressions related to a same entity in a text and thereby aims to find all personal data elements related to entities of the document accurately.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for association of data elements within a document comprising:
   an input data receiving subsystem configured to receive an input data source of the document in one or more formats;
   a feature generation subsystem operatively coupled to the input data receiving subsystem, wherein the feature extraction subsystem is configured to:
   obtain one or more lists of personal data extracted from the input data source upon scanning the input data source of the document using a data source scanning technique, wherein the input data source of the document comprises at least one of a structured data source, a semi-structured data source, an unstructured data source or a combination thereof; and generate one or more personal data features representing a relationship between one or more personal data elements obtained from the one or more lists of the personal data, wherein the one or more personal data features comprises a node feature, an edge feature, a chord feature, a metadata feature, and a personal data content-based feature;

an affinity computation subsystem operatively coupled to the feature generation subsystem, wherein the affinity computation subsystem is configured to:

assess each of the one or more personal data features generated from the one or more personal data elements at a predetermined time interval based on consideration of one or more levels of affinity;

compute an affinity score between the one or more personal data elements using at least one type of affinity function upon assessment of each of the one or more personal data features; and generate one or more affinities for quantification of the relationship between the one or more personal data elements based on the affinity score computed;

a personal data relationship identification subsystem operatively coupled to the affinity computation subsystem, wherein the personal data relationship identification sub system is configured to:

assign the one or more personal data elements to corresponding one or more identification stages based on the one or more affinities generated; and derive a set of identities corresponding to the one or more personal data elements of an individual assigned on the one or more identification stages using an identity creation technique; and an identity filtration subsystem operatively coupled to the personal data identification subsystem, wherein the identity filtration subsystem is configured to:

receive the one or more affinities and the set of identities corresponding to the one or more personal data elements of the individual and each identity represents a unique individual;

determine a validation of the set of identities corresponding to the one or more data elements of the individual based on a utilisation of an identity filtration technique; and filter out the set of identities by eliminating one or more false positive identities based on the validation of the set of identities corresponding to the one or more data elements of the individual determined.

2. The system of claim 1, wherein the one or more formats comprises at least one of a text format, an image format or a combination thereof.

3. The system of claim 1, wherein the one or more lists of the personal data comprises at least one of a static list of one or more personal data elements, a dynamic stream of one or more personal data elements or a combination thereof.

4. The system of claim 1, wherein the data source scanning technique comprises an optical character recognition technique for scanning the input data source statically or dynamically.

5. The system of claim 1, wherein the metadata feature comprises at least one of features associated with a type of input data source, features associated with a size of input data source or a combination thereof.

6. The system of claim 1, wherein the personal data content-based feature corresponding to structured input data source is analysed by utilising a plurality of structured data source specific parameters comprising at least one of number of rows in a table, similarity relationship between a table name and a column name, identification of a repetitive personal data in a column, a confidence value of a column comprising a specific personal data, number of levels in a tree, similarity of keys, continuous representation of personal data in a tree format or a combination thereof.

7. The system of claim 1, wherein the personal data content-based feature corresponding to a semi-structured input data source is analysed by utilising a plurality of semi-structured data source specific parameters comprising at least one of one or more visuals analysis of the personal data for a chunk, a page and a document, text analysis of the personal data for a chunk, a page and a document or a combination thereof.

8. The system of claim 1, wherein the personal data content-based feature corresponding to an un-structured input data source is analysed by utilising a plurality of unstructured data source specific parameters comprising at least one of a continuous representation of personal data analysis for capturing a summary of a personal data content, a per token or a continuous sentence representation analysis of the personal data or a combination thereof.

9. The system of claim 1, wherein the one or more levels of the affinity comprises at least one of node-level affinity, an edge level affinity, a chord level affinity or a combination thereof.

10. The system of claim 1, wherein the affinity score comprises a probability, a logit, an unbounded score, a binary value, an energy value or a correlation value.

11. The system of claim 1, wherein the at least one type of the affinity function for a structured input data source comprises at least one of a rule-based scheme for computation of affinity score, a feature based scheme for computation of affinity score, or a combination thereof.

12. The system of claim 1, wherein the at least one type of the affinity function for a semi-structured data source comprises at least one of a feature based scheme for computation of affinity score, a distance based scheme for computation of affinity score or a combination thereof.

13. The system of claim 1, wherein the at least one type of the affinity function for an un-structured data source comprises at least one of a feature based scheme for computation of affinity score, a language based scheme for computation of affinity score or a combination thereof.

14. The system of claim 1, wherein the identity creation technique corresponding to the input data source comprises at least one of a rule-based identity creation technique, a model-based identity creation technique or a combination thereof.

15. The system of claim 1, wherein the identity filtration technique comprises at least one of a rule-based identity and affinity filtration technique, a learning-based affinity and identity filtration technique or a combination thereof.

16. A method comprising:

receiving, by an input data receiving subsystem, an input data source of the document in one or more formats;

obtaining, by a feature generation subsystem, one or more lists of personal data extracted from the input data source upon scanning the input data source of the document using a data source scanning technique, wherein the input data source of the document comprises at least one of a structured data source, a semi-structured data source, an unstructured data source or a combination thereof;

generating, by the feature generation subsystem, one or more personal data features representing a relationship between one or more personal data elements obtained from the one or more lists of the personal data, wherein the one or more personal data features comprises a node feature, an edge feature, a chord feature, a metadata feature, and a personal data content-based feature;

assessing, by an affinity computation subsystem, each of the one or more personal data features generated from the one or more personal data elements at a predetermined time interval based on consideration of one or more levels of affinity;

computing, by the affinity computation subsystem, an affinity score between the one or more personal data elements using at least one type of affinity function upon assessment of each of the one or more personal data features;

generating, by the affinity computation subsystem, one or more affinities for quantification of the relationship between the one or more personal data elements based on the affinity score computed;

assigning, by a personal data relationship identification subsystem, the one or more personal data elements to corresponding one or more identification stages based on the one or more affinities generated;

deriving, by the personal data identification subsystem, a set of identities corresponding to the one or more personal data elements of an individual assigned on the one or more identification stages using an identity creation technique;

receiving, by an identity filtration subsystem, the one or more affinities and the set of identities corresponding to the one or more personal data elements of the individual and each identity represents a unique individual;

determining, by the identity filtration subsystem, a validation of the set of identities corresponding to the one or more data elements of the individual based on a utilisation of an identity filtration technique; and filtering out, by the identity filtration subsystem, the set of identities by eliminating one or more false positive identities based on the validation of the set of identities corresponding to the one or more data elements of the individual determined.

* * * * *